United States Patent
Pu et al.

(10) Patent No.: US 11,656,454 B2
(45) Date of Patent: *May 23, 2023

(54) STEERABLE OPTICAL ASSEMBLIES

(71) Applicant: Microsoft Technology Licensing, LLC, Redmond, WA (US)

(72) Inventors: Chuan Pu, Foster City, CA (US); Jincheng Wang, Sammamish, WA (US); Kingsuk Maitra, Milpitas, CA (US); Michael James Nystrom, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 237 days.

This patent is subject to a terminal disclaimer.

(21) Appl. No.: 17/117,669

(22) Filed: Dec. 10, 2020

(65) Prior Publication Data
US 2021/0132363 A1 May 6, 2021

Related U.S. Application Data

(63) Continuation of application No. 15/993,435, filed on May 30, 2018, now Pat. No. 10,890,755.

(51) Int. Cl.
*G02B 26/08* (2006.01)

(52) U.S. Cl.
CPC ....... *G02B 26/085* (2013.01); *G02B 26/0875* (2013.01); *G02B 26/0883* (2013.01)

(58) Field of Classification Search
None
See application file for complete search history.

(56) References Cited

U.S. PATENT DOCUMENTS

2009/0243006 A1* 10/2009 Takahashi ........... B81C 1/00126
 438/51
2014/0002964 A1* 1/2014 Li ....................... G02B 26/001
 361/679.01

* cited by examiner

*Primary Examiner* — Jennifer D. Carruth
(74) *Attorney, Agent, or Firm* — Rainier Patents, P.S.

(57) ABSTRACT

The description relates to computing devices that employ steerable optics. One example includes a steering mechanism and a base substrate positioned relative to the steering mechanism. The example also includes an optical substrate positioned over the base substrate and an adhesive complex securing the optical substrate relative to the base substrate with multiple different types of adhesives.

21 Claims, 8 Drawing Sheets

INSTANCE ONE

INSTANCE TWO

STEERABLE OPTICAL ASSEMBLIES

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

DESCRIPTION

The present concepts relate to optical assemblies, such as optical micro electromechanical systems (MEMS). The present concepts can physically secure an optical substrate to a base substrate so that when the base substrate is steered, the motion is transferred to the optical substrate. The present concepts can ensure this motion transfer while otherwise isolating the optical substrate from the base substrate so that changes to the base substrate have less effect on the optical substrate. Further, these implementations can reduce distortions in the optical substrate for enhancing optical device performance. These and other aspects are described below.

Figure 1:
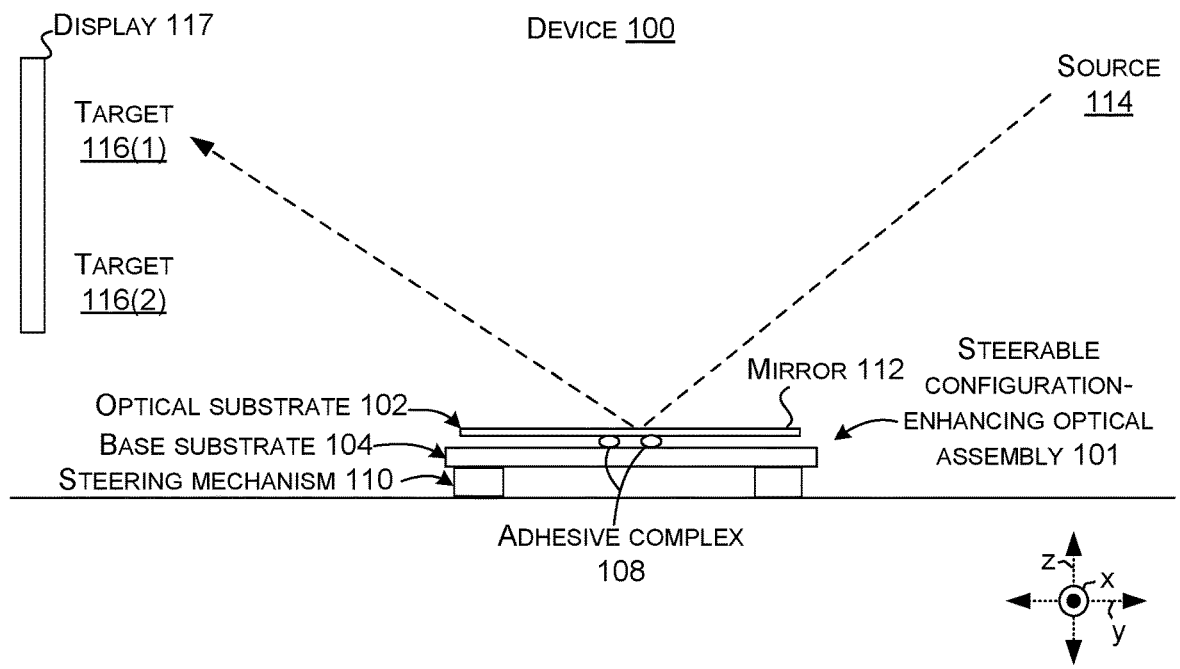
FIG. 1 is a side view of an example device implementation in accordance with the present concepts.
Figure 1:
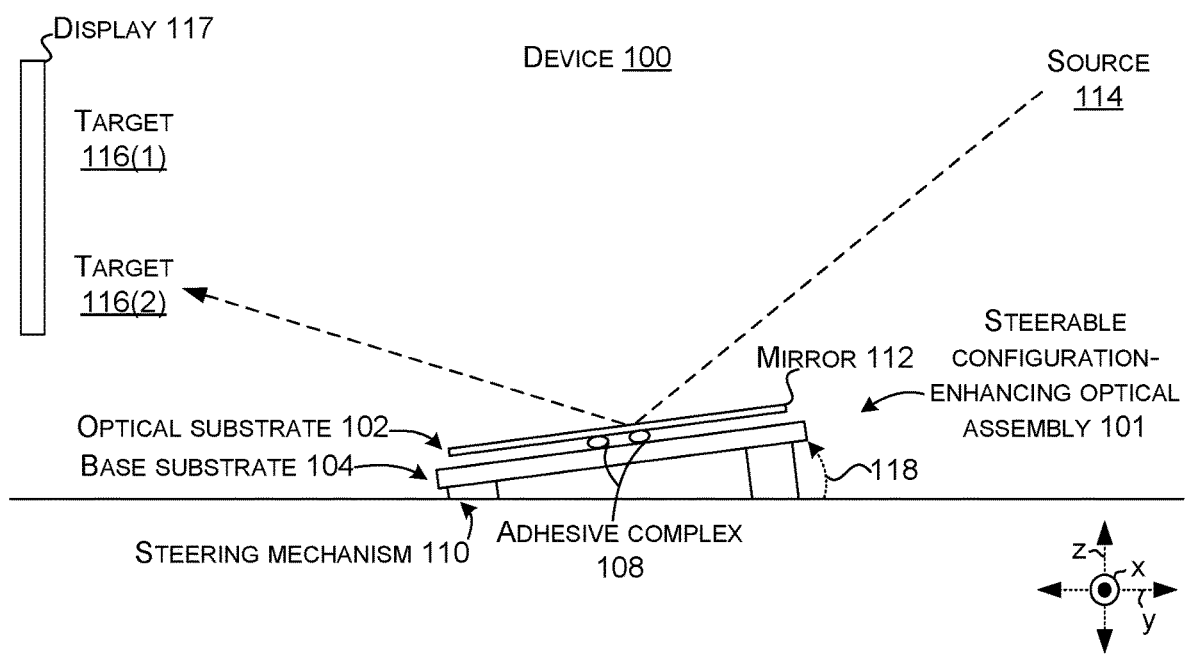

FIG. 1 shows an example device 100 that can include a steerable configuration-enhancing optical assembly 101, which may be viewed as an optical MEMS device. The steerable configuration-enhancing optical assembly can include an optical substrate 102 that can be physically secured to a base substrate 104 by an adhesive complex 108. An orientation of the base substrate 104 can be controlled (e.g., steered) by a steering mechanism 110. Thus, the optical substrate 102 can be steered by controlling the steering mechanism 110. Various types of steering mechanisms can be employed, such as electrical/magnetic coils and magnetic field generators, among others.

In the illustrated example of FIG. 1, the optical substrate 104 is manifest as a mirror 112. Other optical substrates, can includes lenses, prisms, etc. The mirror may be formed from a silicon or glass material, among others, with reflective layers positioned thereon. In this example, the mirror 112 can redirect light (represented by dashed arrow) from a source 114 to a target 116, such as relating to a display 117, among others. For example, at Instance one, the mirror 112 can redirect light from source 114 to target 116(1). In Instance two, steering mechanism 110 has adjusted the orientation of the base substrate 104 and hence the optical substrate 102 as indicated at 118. Now the mirror 112 can redirect the light from the source to target 116(2).

Operation of the steering mechanism 110 can generate heat or thermal energy that can heat and/or distort the base substrate 104. The adhesive complex 108 can reduce the extent to which the thermal energy is transferred to and/or otherwise negatively affects the optical substrate 102. Toward this end, the adhesive complex 108 can physically secure the base substrate 104 to the optical substrate 102 with less adhesive than traditional techniques. Further, the adhesive can be applied as multiple relatively small, discrete, units of adhesive. Alternatively or additionally, the adhesive complex can generally be positioned toward a center of the optical substrate so that a majority of the optical substrate is insulated by air, which can flow between the base substrate and the optical substrate. These aspects are discussed in more detail below relative to FIGS. 2A-6.

Stated another way, the optical substrate 102 can be defined by design parameters to have an intended or design configuration that allows the optical substrate to act upon light as intended. For instance, the design configuration of mirror 112 can be planar. However, in practice, optical substrates that are actually produced may deviate from the design configuration. In some of the present implementations, individual adhesives can be selected for bonding to individual portions of the optical assembly to enhance performance of the optical substrate. One such example is discussed below starting at FIG. 3A.

Figure 2A:
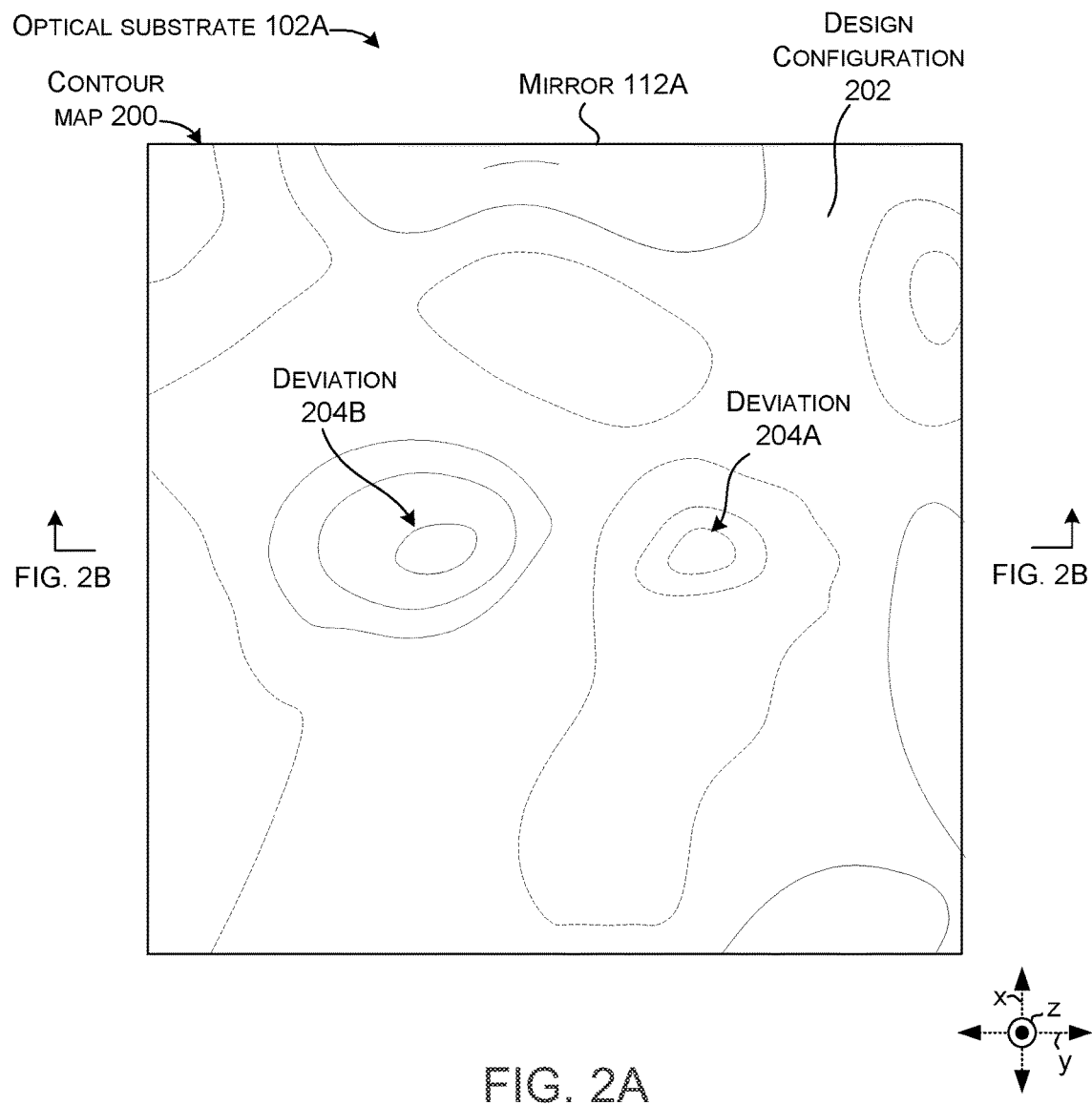
FIG. 2A is a top view of an example optical substrate implementation in accordance with the present concepts.
Figure 2B:
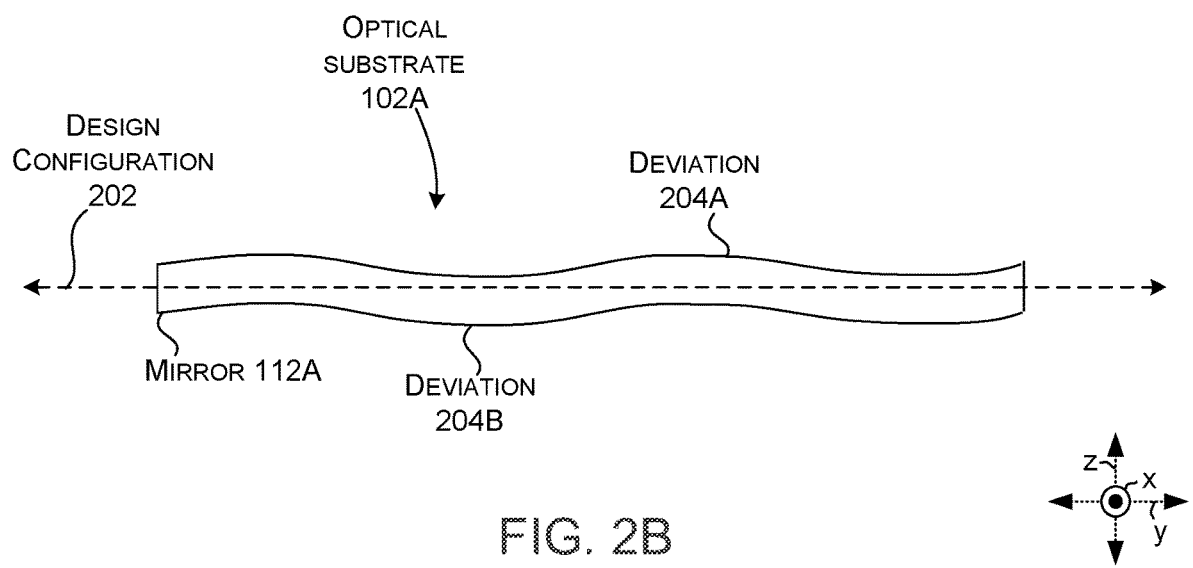
FIG. 2B is a side view of an example optical substrate implementation in accordance with the present concepts.
Figure 3A:
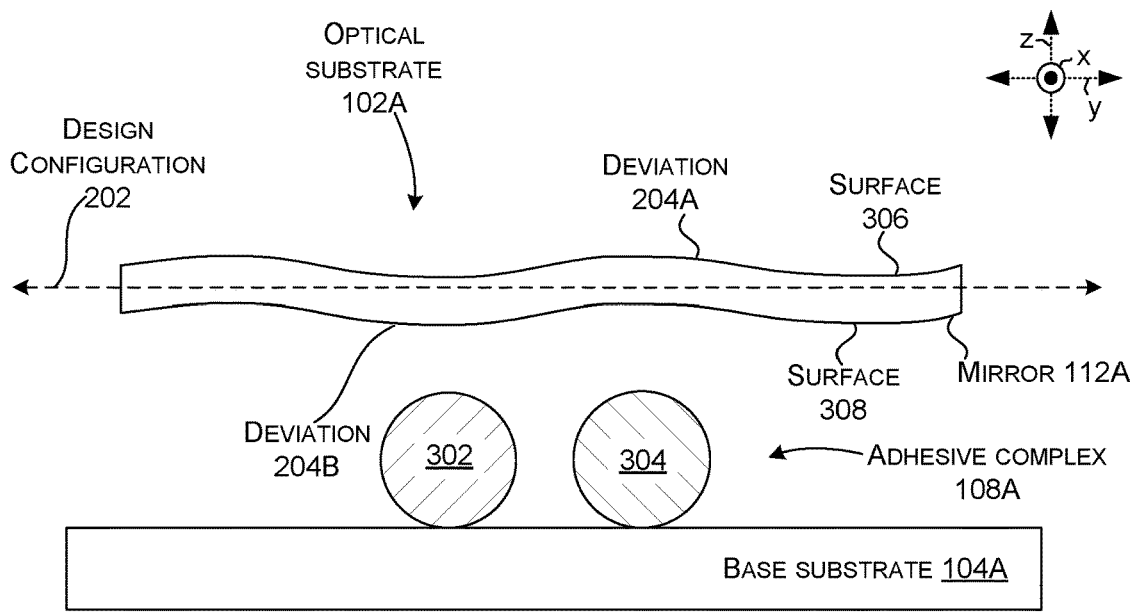
FIGS. 3A-6 are side views of example steerable configuration-enhancing optical assemblies in accordance with the present concepts.
Figure 3B:
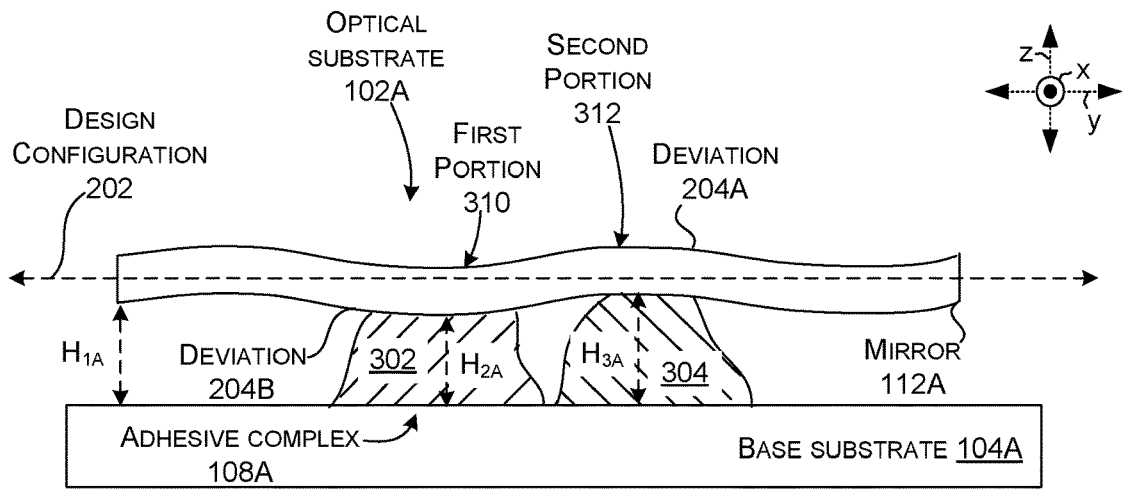
Figure 3C:
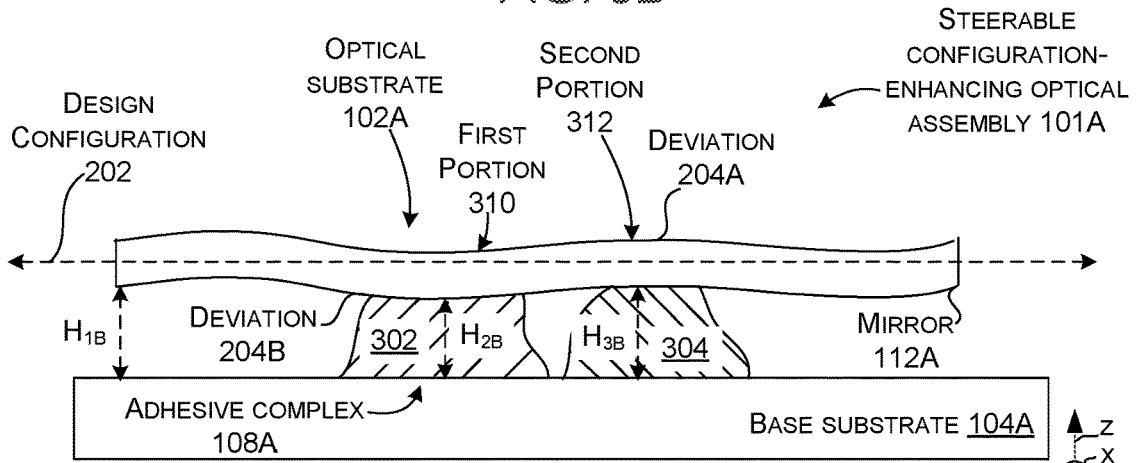

FIGS. 2A-3C collectively show how a steerable configuration-enhancing optical assembly 101A can improve the optical substrate by decreasing the deviation (e.g., bringing the optical substrate 102A closer to the design configuration). FIGS. 2A and 2B show an example configuration of mirror 112A. FIGS. 3A-3C show an example of how the steerable configuration-enhancing optical assembly 101A can improve the mirror configuration.

FIG. 2A shows an example contour map 200 of mirror 112A. FIG. 2B shows a sectional view of mirror 112A as indicated in FIG. 2A. The view of FIG. 2B is similar to the view of FIG. 1. The mirror 112A has a design or intended configuration 202. In this case, the design configuration 202 is planar (e.g., the mirror 112A is designed to be planar relative to the xy-reference plane). However, the mirror 112A has deviations 204 from the planar configuration. In this example, deviations above the plane are represented at 204A (dashed lines on FIG. 2A) and deviations below the plane are represented at 204B (dotted lines on FIG. 2A). FIGS. 3A-3C collectively show an example of how the present concepts can both secure the optical substrate 102A to the base substrate 104A and decrease the deviations of the optical substrate 102A.

FIG. 3A shows the optical substrate 102A ready to be positioned relative to the base substrate 104A by adhesive complex 108A. In this case, the adhesive complex includes a first adhesive 302 and a second adhesive 304. At this point, the first and second adhesives are in a relatively more flowable state (e.g., relatively flowable application state).

The optical substrate 102A includes upper and lower surfaces 306 and 308. In the designed configuration, the upper and lower surfaces 306 and 308 would be equidistance from the plane along the length of the optical substrate (e.g., both surfaces would be planar and the plane of the design configuration would lie equidistance from each surface). Such a situation is shown at height $H_{1A}$ (FIG. 3B) to lower surface 308 where the design configuration plane 202 lies midway between the upper and lower surfaces.

FIG. 3B shows the optical substrate 102A lowered toward the base substrate 104A until contacting the first adhesive 302 and the second adhesive 304. The first and second adhesives remain in the relatively flowable state. Note that the first adhesive 302 is contacting a first portion 310 of the optical substrate 102A that is distorted below the design configuration plane 202 as represented by height $H_{2A}$ which is less than height $H_{1A}$. The second adhesive 304 is contacting a second portion 312 of the optical substrate that is distorted above the design configuration plane 202 as indicated by height $H_{3A}$ which is greater than height $H_{1A}$.

FIG. 3C shows the optical substrate 102A secured to the base substrate 104A by the adhesive complex 108A and deviation of the optical substrate has decreased relative to FIG. 3B. For instance, deviation 204A of second portion 312 is less in FIG. 3C than in FIG. 3B. In this example, the securing can be accomplished by transitioning (e.g., curing) the first adhesive 302 and the second adhesive 304 from the relatively pliant flowable state of FIG. 3B to a less pliant (e.g., relatively less flowable) adhesive state.

One effect of this state transitioning of adhesives 302 and 304 is that the adhesives tend to contract (e.g., an individual adhesive tends to have a smaller volume in the less pliant adhesive state than in the more pliant flowable state). As the adhesives contract they impart forces that can bend the optical substrate (e.g., distortive forces). However, the percent of volume contraction associated with the adhesive phase change in not uniform for all types of adhesives. In fact, some adhesives contract to a much greater extent than other types. The present concepts can leverage this property and match adhesive type to the contour map (200, FIG. 2A) of the optical substrate.

In this implementation, the first portion 310 has a deviation 204B below the design configuration 202 (e.g., toward the base substrate 104A) and the second portion 312 is above the design configuration 202 (e.g., away the base substrate 104A). Accordingly, the first adhesive 302 can be selected to have a relatively low contraction coefficient to reduce the extent to which the first portion is pulled farther from the design configuration 202. In contrast, the second adhesive 304 can be selected that has a relatively large coefficient of contraction so that it can pull the second portion toward the design configuration. Stated another way, transition of the second adhesive 304 can impart a relatively greater distortive force per unit area between the second portion 312 of the optical substrate 102A and the base substrate 104A. This force can pull the second portion 312 toward the base substrate 104A. This is evidenced in that height $H_{3B}$ in FIG. 3C between the base substrate 104A and the second portion 312 is less than height $H_{3A}$ in FIG. 3B.

Transition of the first adhesive 302 can impart relatively less distortive force per unit area between the first portion 310 of the optical substrate 102A and the base substrate 104A. This is evidenced in that height $H_{2B}$ in FIG. 3C between the base substrate 104A and the first portion 310 is only slightly less (e.g., approximately equal) to height $H_{2A}$ in FIG. 3B. In this implementation, other portions of the optical assembly represented by height $H_{1A}$ and $H_{1B}$ can remain approximately equal during the adhesion process. As a result, deviation of second portion 312 is decreased in FIG. 3C compared to FIG. 3B while deviation of first portion 310 remains generally constant. Thus, the overall configuration of the optical substrate 102A is closer to the design configuration when the adhesives 302 and 304 of the adhesive complex 108A have secured the optical substrate 102A to the base substrate 104A.

Further, the improved configuration of FIG. 3C can be achieved with the adhesive complex 108A bonded to a relatively small percentage of the optical substrate 102A. For instance, improved configurations can be achieved when the adhesive complex is bonded to less than 10% of the total area of the optical substrate when measured along the xy-reference plane. Bonding a relatively small area of the optical substrate to the base substrate can reduce degradation of the optical substrate due to factors associated with the base substrate, such as heat generated by steering the steerable configuration-enhancing optical assembly.

FIGS. 4A-4E collectively show another example implementation of a steerable configuration-enhancing optical assembly 101B. This implementation is similar to steerable configuration-enhancing optical assembly 101A and includes additional features.

Figure 4A:
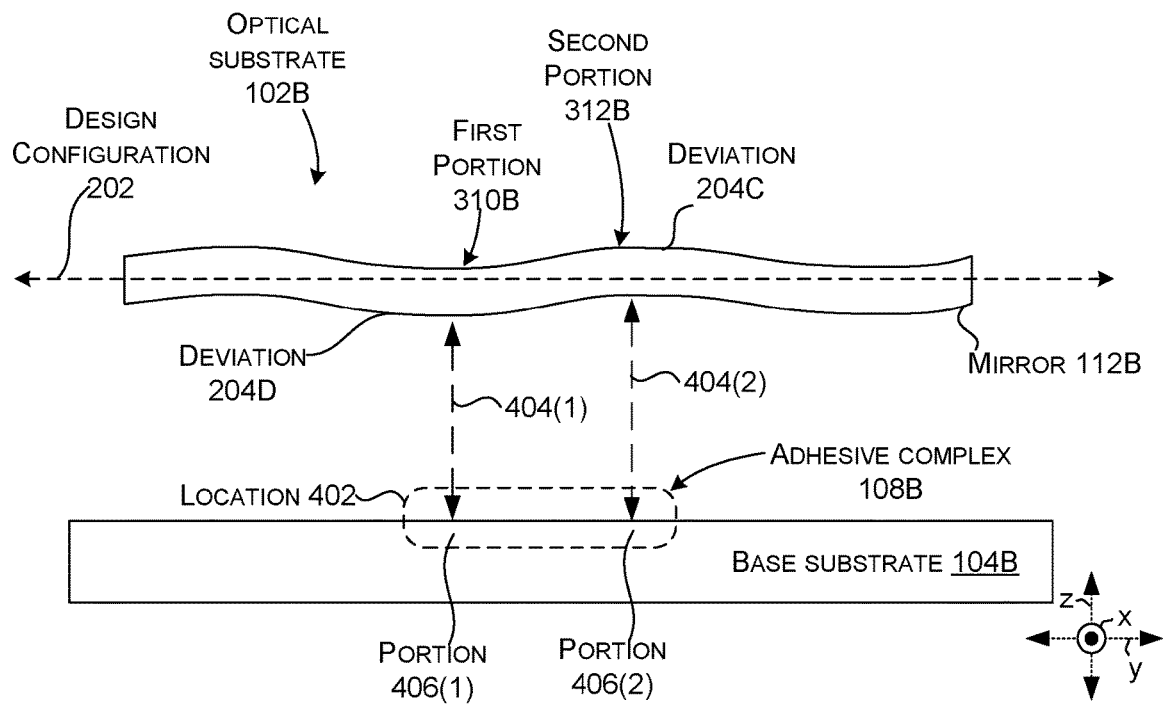

FIG. 4A shows a location 402 of the adhesive complex 108B (not yet added). Arrows 404 correlate specific portions 406 of the base substrate 104B to specific portions 310B and 312B of the optical substrate 102B. (This correlation can occur in 3D, but is represented in 2D (along the yz-reference plane) for ease of illustration). For instance, portion 406(1) is aligned with first portion 310B and portion 406(2) is aligned with second portion 312B. Note that first portion 310B has a negative deviation 204B and second portion 312B has a positive deviation 204C.

Figure 4B:
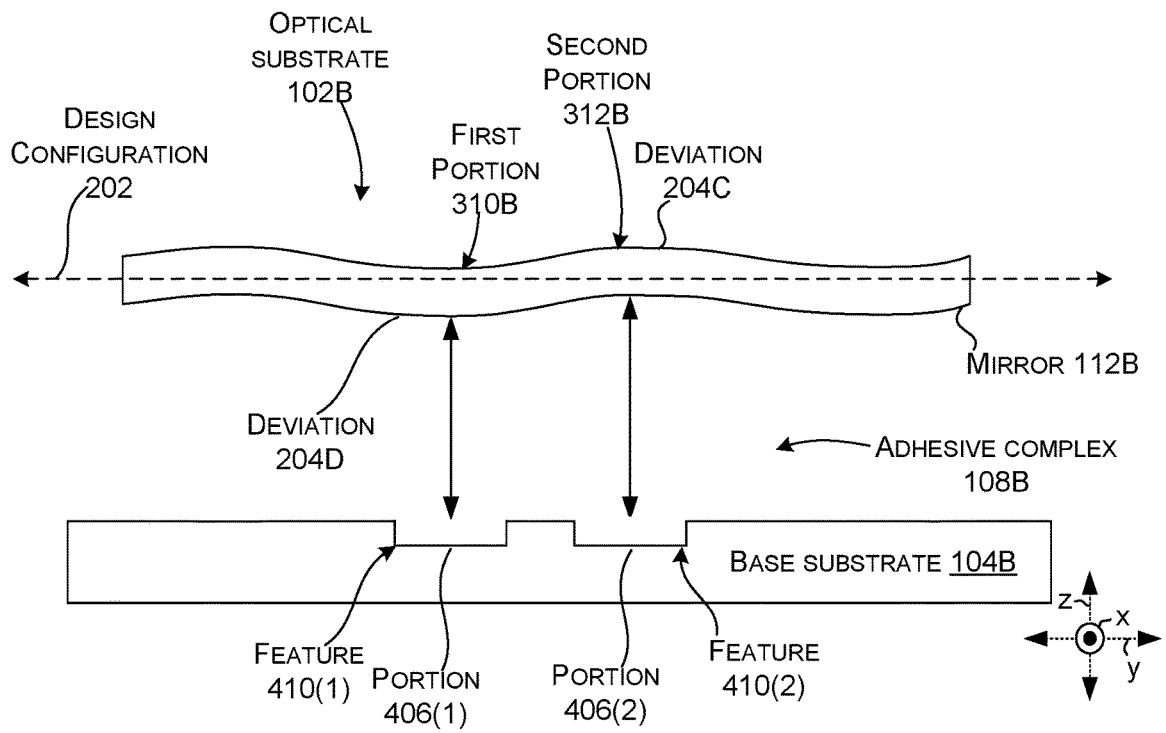

As explained above relative to FIGS. 3A-3C the present implementations can advantageously select individual adhesives for each of these deviations based upon the properties of the adhesive and the deviation that the adhesive will contact. However, often adhesives that could reduce some of the deviations may have other characteristics or properties that are unsatisfactory for this application. For instance, some of these adhesives may be so flowable that they tend to flow beyond the portions of the base substrate 104B to which they are applied. Adhesive flow can result in the adhesive contacting and bonding to unintended portions of the optical substrate 102B. This unintended bonding could result in increasing deviations of the optical substrate rather than decreasing the deviations. The unintended bonding can also increase the percentage of the optical substrate that is thermally bonded by adhesive to the base substrate and thereby undesirably increase thermal transfer from the base substrate to the optical substrate. FIG. 4B introduces a solution to this problem.

FIG. 4B shows retainment features 410(1) and 410(2) added to base substrate 104B at portions 406(1) and 406(2), respectively. The retainment features can be formed in various ways, such as by removing material from the base substrate and/or by selectively adding material to the top surface of the base substrate (e.g., patterning the retainment features). The location of the retainment features 410 on the base substrate can be based upon the contours (e.g., the locations of deviations 204C) of the optical substrate 102B.

Figure 4C:
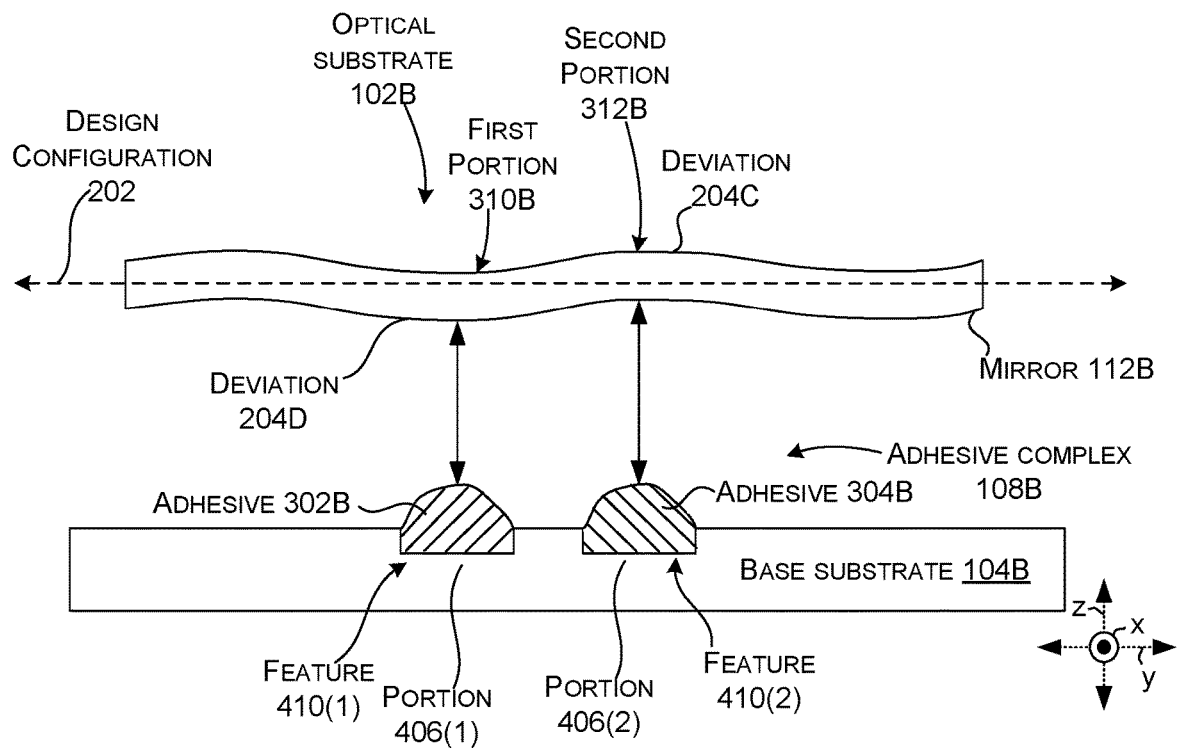

FIG. 4C shows adhesive 302B positioned in retainment feature 410(1) of portion 406(1) and adhesive 304B positioned in retainment feature 410(2) of portion 406(2). The adhesives can be applied in their relatively flowable state. The retainment features 410 can function to retain the adhesive relative to the intended portion and reduce/limit and/or prevent migration of adhesive in the x and/or y reference directions. This is especially important because as explained above relative to FIGS. 3A-3C, the present implementations can select adhesives with specific properties at specific locations on the base substrate 104B that underly specific portions of the optical substrate. The selected adhesives can have contraction coefficients selected to impart more or less forces on the individual portions of the optical substrate. The present implementations can also bond a smaller percentage of the optical substrate to the base substrate with adhesive than traditional techniques. Further, the present techniques can utilize multiple small discrete units of adhesive at point specific locations and the retainment features facilitate these approaches.

Figure 4D:
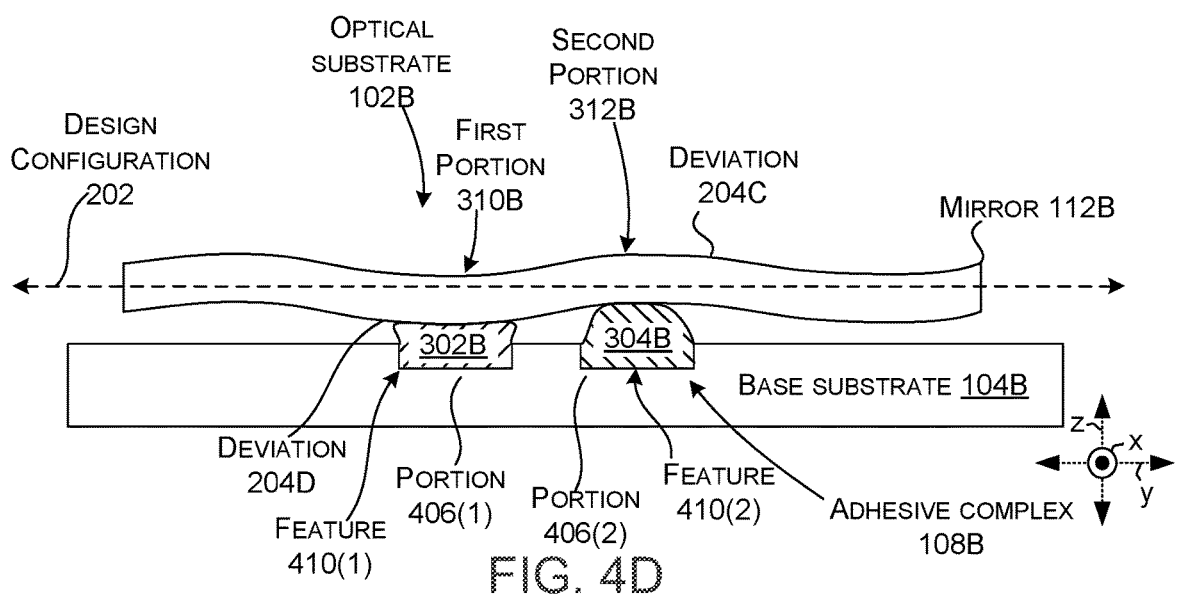

FIG. 4D shows the optical substrate 102B moved toward the base substrate 104B until the adhesives 302B and 304B are contacting the optical substrate. At this point, the adhesives 302B and 304B remain in their relatively flowable state.

Figure 4E:
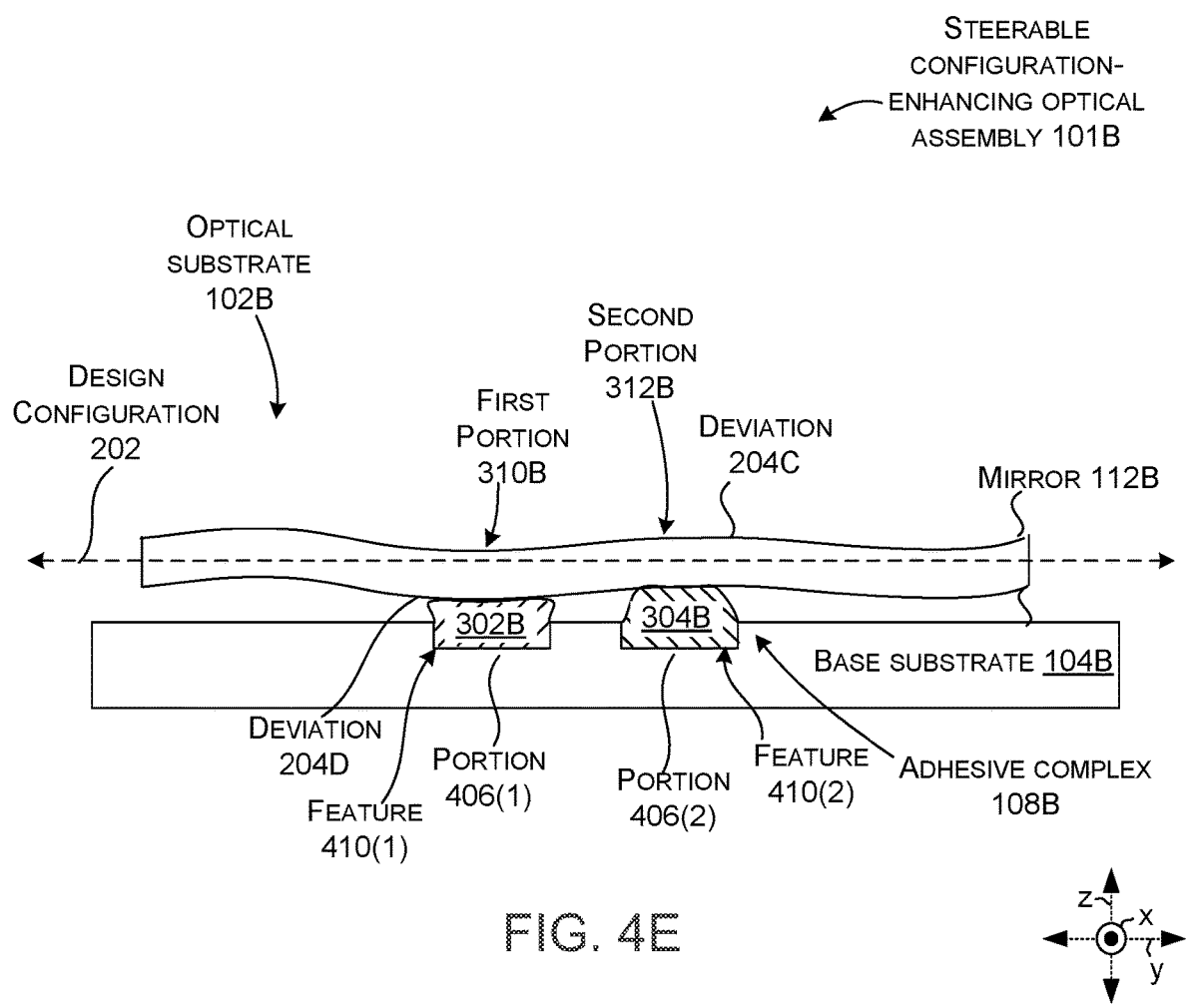

FIG. 4E shows the steerable configuration-enhancing optical assembly 101B after state transition (e.g., curing or transitioning to the cured state) of the adhesives 302B and 304B. At this point, the cured adhesives contracted and are applying forces to the base substrate 104B (upward) and the optical substrate 102B (downward). The forces are more extensive relative to adhesive 304B that 302B. Given that the base substrate is relatively stiffer than the optical substrate, little or no deflection of the base substrate occurs. However, adhesive 304B causes a relatively large amount of downward deflection of the optical substrate at the second portion 312B such that deviation 204C is reduced in FIG. 4E relative to FIG. 4D. Thus, strategically selecting adhesives based upon which portions of the optical substrate they bond to and the deviation of those portions, the present implementations can produce a finished steerable configuration-enhancing optical assembly where the integrated (e.g., secured) optical substrate has less deviation than the optical substrate had before integration.

Figure 5A:
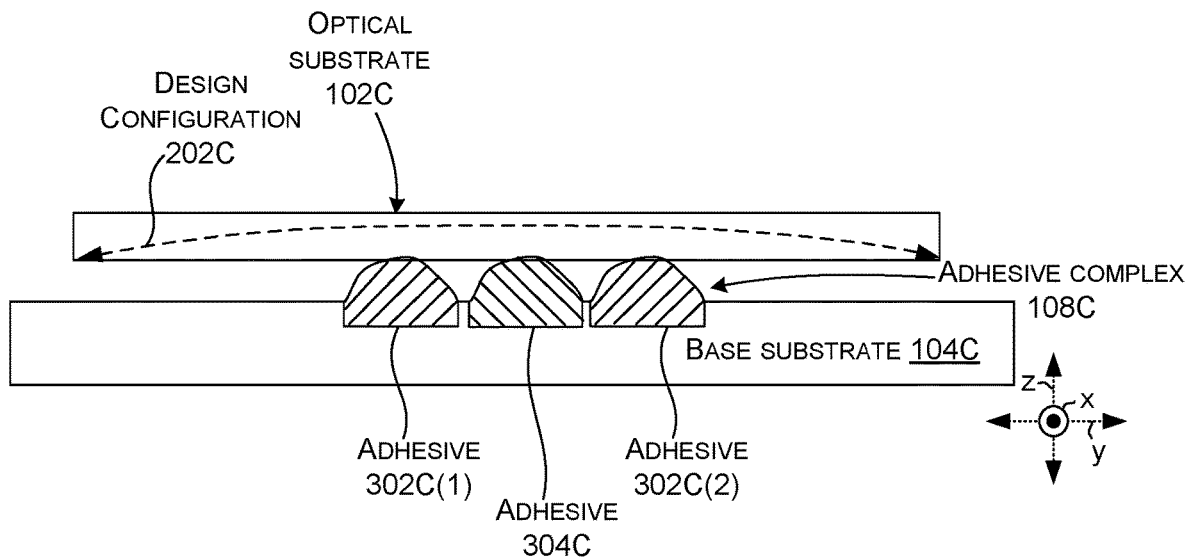
Figure 5B:
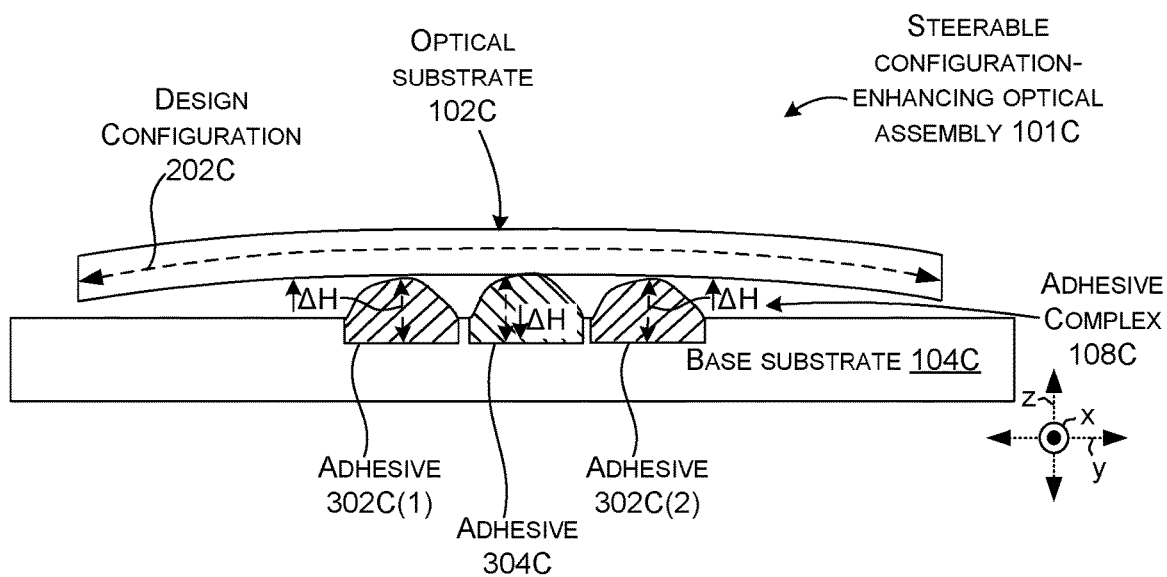

FIGS. 5A-5B collectively show another steerable configuration-enhancing optical assembly 101C. In this case, the adhesive complex 108C can be used to affect the optical substrate toward the design configuration 202C. In this example, assume that the design configuration 202C specifies a curved optical substrate 102C, but that for various reasons, such as difficulty in manufacturing, optical substrate conforming to the design configuration are not available.

FIG. 5A shows the optical substrate 102C in contact with the adhesives 302C and 304C of the adhesive complex 108C. The adhesives are in the relatively flowable state at this point. In this case, the adhesives include adhesive 304C which experiences relatively little shrinkage during curing. Adhesives 302C(1) and 302C(2) are positioned on each side of adhesive 304C and are selected to experience relatively high amounts of shrinkage during curing.

FIG. 5B shows the resultant steerable configuration-enhancing optical assembly 101C after curing the adhesives 302C and 304C. As indicated adhesives 302C(1) and 302C(2) have experienced a high rate of shrinkage as represented by a greater change in height ($\uparrow \Delta H$) compared to adhesive 304C ($\downarrow \Delta H$). This shrinkage pulls down on the ends of the optical assembly 101C while the middle stays relatively stationary. The forces of this shrinkage can bend the optical substrate 102C toward the design configuration 202C. Thus, the present concepts can be used to achieve a desired optical substrate configuration that is otherwise difficult to achieve. This desired optical substrate can be achieved by selecting adhesives having different shrinkage ratios based upon the overlying deviation of the optical substrate.

Figure 6:
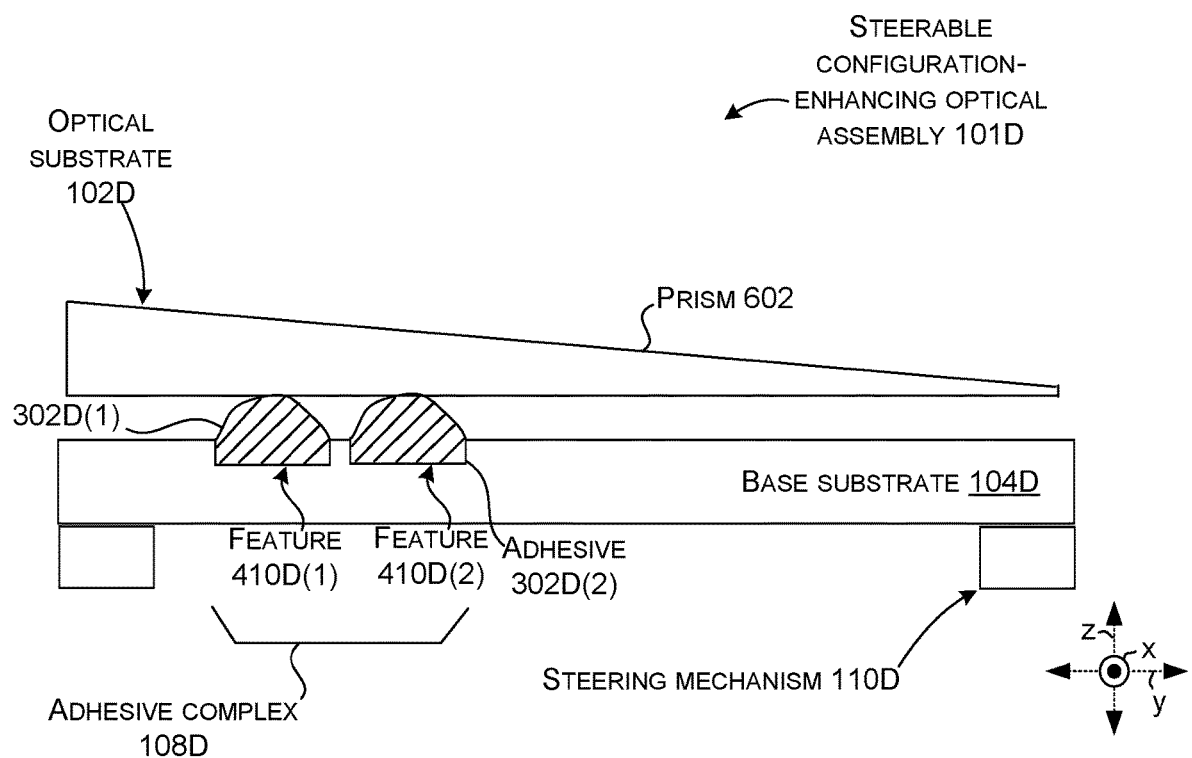

In the examples described above, the optical substrates 102 have been generally symmetrical and the adhesive complex 108 has been positioned in the geometric center of the optical substrates. FIG. 6 shows an alternative scenario.

FIG. 6 shows a steerable configuration-enhancing optical assembly 101D. In this case, the optical substrate 102D is manifest as a prism 602. In this example, the adhesive complex 108D includes two identical adhesives 302D(1) and 302D(2). The optical adhesive are positioned in features 410D(1) and 410D(2) which serve to reduce migration and spreading of the adhesive. The use of multiple small adhesive areas can effectively bond the optical substrate 102D to the base substrate 104D with less adhesive area than a single large amount of adhesive. The small adhesive area can keep the optical assembly more thermally isolated from the base substrate than a single large adhesive. Further, in this case the adhesive complex is positioned approximately under a center of gravity of the prism 602 to decrease any dynamic load experienced by the prism when the optical substrate is steered by the steering mechanism.

The present implementations can utilize multiple small discrete units of adhesives to bond the optical substrate to the base substrate. Further, individual adhesives can be selected to have properties that facilitate compliance of the optical substrate to its design configuration.

Various examples are described above. Additional examples are described below. One example includes a device comprising a steering mechanism, a base substrate positioned relative to the steering mechanism, an optical substrate positioned over the base substrate, and an adhesive complex securing the optical substrate relative to the base substrate, the adhesive complex comprising a first adhesive securing a first portion of the base substrate and the optical substrate and that imparts a relatively greater distortive force per unit area between the optical substrate and the base substrate and a second adhesive securing a second portion of the base substrate and the optical substrate and that imparts a relatively less distortive force per unit area between the optical substrate and the base substrate.

Another example can include any of the above and/or below examples where the steering mechanism comprises a magnetic coil and a magnetic field generator.

Another example can include any of the above and/or below examples where the optical substrate comprises a mirror, a lens, or a prism.

Another example can include any of the above and/or below examples where the optical substrate is designed to extend along a plane.

Another example can include any of the above and/or below examples where the optical substrate includes portions that deviate from the plane away from the base substrate and other portions that deviate away from the plane toward the base substrate.

Another example can include any of the above and/or below examples where the first adhesive is secured to the portions and the second adhesive is secured to the other portions.

Another example can include any of the above and/or below examples where the first adhesive experiences a greater change in volume when transitioning from a more flowable application state to a more rigid securing state.

Another example can include any of the above and/or below examples where the base substrate includes a retainment feature that limits migration of the second adhesive in the more flowable application state.

Another example can include any of the above and/or below examples where the base substrate includes other retainment features that limit migration of the first adhesive in the more flowable application state.

Another example can include any of the above and/or below examples where the retainment feature is formed on a first surface of the base substrate that faces the optical substrate.

Another example can include any of the above and/or below examples where the retainment feature is formed into the base substrate through the first surface.

Another example can include any of the above and/or below examples where location of the retainment feature is based upon contours of the optical substrate away from the plane.

Another example includes a device comprising a steering mechanism, a base substrate positioned relative to the steering mechanism, an optical substrate positioned over the base substrate, and an adhesive complex securing the optical substrate relative to the base substrate with multiple different types of adhesives.

Another example can include any of the above and/or below examples where the adhesive complex comprises less than 10% of a total area of the optical substrate.

Another example can include any of the above and/or below examples where the multiple different types of adhesives have different shrinkage ratios between an application state and a cured state.

Another example can include any of the above and/or below examples where the application state is a relatively more flowable state and the cured state is a relatively less flowable state.

Another example can include any of the above and/or below examples where adhesive of the adhesive complex is aligned with deviations of the optical substrate from a planar configuration.

Another example can include any of the above and/or below examples further comprising retainment features on the base substrate that align with the deviations.

Another example can include any of the above and/or below examples where the retainment features are formed into the base substrate.

Another example includes a device comprising a display and a steerable configuration-enhancing optical assembly comprising a base substrate secured to an optical substrate by multiple discrete adhesives.

CONCLUSION

Although techniques, methods, devices, systems, etc., pertaining to steerable configuration-enhancing optical assemblies are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method, comprising:
   positioning an optical substrate over a base substrate, the optical substrate having deviations from a design configuration;
   locating a first discrete adhesive of a first contraction type between an individual deviation of the optical substrate and the base substrate and a second discrete adhesive of a second contraction type between another individual deviation of the optical substrate and the base substrate; and,
   causing the first and second discrete adhesives to impart contractive forces between the base substrate and the optical substrate that decreases at least one of the individual deviation and the another individual deviation.

2. The method of claim 1, wherein the positioning comprises positioning an optical substrate comprising a mirror.

3. The method of claim 2, wherein the design configuration of the mirror is planar.

4. The method of claim 3, wherein the individual deviation is away from the base substrate and the another individual deviation is toward the base substrate, or wherein the individual deviation is away from the base substrate and the another individual deviation is away from the base substrate.

5. The method of claim 4, wherein the locating comprises locating the first discrete adhesive in a flowable state and the second discrete adhesive in a flowable state onto the base substrate and moving the optical substrate and the base substrate toward one another until the first discrete adhesive and the second discrete adhesive contact the optical substrate.

6. The method of claim 5, wherein the causing comprises transitioning the first discrete adhesive and the second discrete adhesive from the flowable state to an adhesive state.

7. The method of claim 6, wherein the contractive forces bend the individual deviation toward the base substrate.

8. The method of claim 7, wherein the causing the first and second discrete adhesives to transition to the adhesive state causes a reduction in volume that pulls an individual overlying deviation toward the design configuration.

9. A method, comprising:
   obtaining a map of deviations of an optical substrate to be secured to a base substrate;
   positioning a first type of adhesive between the base substrate and the optical substrate proximate to deviations in the optical substrate away from the base substrate and a second type of adhesive between the base substrate and other areas of the optical substrate, the first type of adhesive having a relatively high contraction coefficient and the second type of adhesive having a relatively low contraction coefficient; and,
   causing at least the first type of adhesive to contract and decrease an extent of the deviations in the optical substrate away from the base substrate.

10. The method of claim 9, wherein the positioning comprises positioning the first type of adhesive and the second type of adhesive in a flowable state.

11. The method of claim 9, wherein the causing comprises causing the first type of adhesive to change state to an adhesive state.

12. The method of claim 11, wherein the causing comprises waiting for a duration of time or wherein the causing comprises actively curing the first type of adhesive.

13. The method of claim 12, wherein the first type of adhesive in the adhesive state at least in part secures the optical substrate to the base substrate.

14. The method of claim 13, wherein the positioning comprises positioning in retainment features on the base substrate that align with the deviations.

15. A device, comprising:
   a base substrate; and,
   an optical substrate secured to the base substrate by multiple discrete spaced-apart adhesives, individual adhesives extending completely between the base substrate and the optical substrate and having different contraction properties from at least some other individual adhesives.

16. The device of claim 15, wherein the base substrate is positioned on a steering mechanism.

17. The device of claim 15, wherein individual adhesives are positioned in individual features formed on the base substrate.

18. The device of claim 15, wherein the multiple discrete spaced-apart adhesives collectively contact less than ten percent of a surface of the optical substrate facing the base substrate.

19. The device of claim 15, wherein the contraction properties relate to a percentage of volumetric change when an individual adhesive undergoes a state change.

20. The device of claim 19, wherein the optical substrate includes a deviation away from the base substrate.

21. The device of claim 20, wherein a first individual adhesive positioned under the deviation has a larger volumetric change than at least some other individual adhesives.

* * * * *